(12) United States Patent
Garczarek et al.

(10) Patent No.: US 8,570,533 B2
(45) Date of Patent: Oct. 29, 2013

(54) POSITION MEASURING DEVICE

(75) Inventors: Florian Garczarek, Lahnsu (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 13/476,113

(22) Filed: May 21, 2012

(65) Prior Publication Data

US 2012/0293809 A1    Nov. 22, 2012

(30) Foreign Application Priority Data

May 20, 2011   (DE) .......................... 10 2011 076 178

(51) Int. Cl.
*G01B 11/14*   (2006.01)
(52) U.S. Cl.
CPC ...................................... *G01B 11/14* (2013.01)
USPC ............ 356/614; 356/615; 356/616; 356/620
(58) Field of Classification Search
CPC ....................................................... G01B 11/14
USPC .................. 356/614–625, 399–401, 450–521
See application file for complete search history.

(56) References Cited

U.S. PATENT DOCUMENTS

| 4,052,603 | A * | 10/1977 | Karlson ......................... 700/192 |
| 7,471,397 | B2 | 12/2008 | Holzapfel |
| 7,573,581 | B2 | 8/2009 | Holzapfel |
| 2012/0105862 | A1* | 5/2012 | Holzapfel ..................... 356/499 |
| 2013/0057872 | A1* | 3/2013 | Holzapfel ..................... 356/498 |

FOREIGN PATENT DOCUMENTS

| EP | 1 739 395 A2 | 1/2007 |
| EP | 1 762 828 A2 | 3/2007 |

* cited by examiner

*Primary Examiner* — Michael P Stafira
(74) *Attorney, Agent, or Firm* — Brinks Hofer Gilson & Lione

(57) ABSTRACT

A position measuring device including a reflective scale and a scanning unit. The scanning unit includes a retroreflector and a signal unit wherein the signal unit includes a light source and a detector arrangement. The scanning unit and the signal unit are structurally separate from one another and are disposed in planes parallel to one another, and wherein the scanning unit is movable relative to the reflective scale in a measuring direction. The light source emits a beam that propagates freely in a direction to the scanning unit, wherein from the scanning unit along the direction to the signal unit a pair of interfering partial beams propagate freely and wherein between the signal unit and the scanning unit the partial beams propagate freely in a propagation direction that is oriented perpendicular to the planes.

18 Claims, 7 Drawing Sheets

POSITION MEASURING DEVICE

RELATED APPLICATIONS

Applicants claim, under 35 U.S.C. §119, the benefit of priority of the filing date of May 20, 2011 of a German patent application, copy attached, Serial Number 10 2011 076 178.0, filed on the aforementioned date, the entire contents of which is incorporated herein by reference.

BACKGROUND

1. Technical Field

The present invention relates to a position measuring device and to an apparatus having such a position measuring device.

2. Background Information

From European patent disclosure EP 1 739 395 A1, a position measuring device is known for high-precision position determination of objects that are movable relative to one another. These objects can, for instance, be machine components in semiconductor production equipment whose relative position to one another must be determined.

The known position measuring device includes a scale and a scanning unit that is movable in at least one measuring direction relative to the scale. A series of different elements for high-resolution optical scanning of the scale are disposed in the scanning unit. For instance, in the scanning units of the various exemplary embodiments, a light source, an optoelectronic detector arrangement, and one or more scanning plates with grating structures and retroreflectors disposed on them are provided. For certain applications, it is possible to place the light source and the detector arrangement spatially separate from the scanning unit, in a separate signal unit. Both the focused beams of the scanning unit or the scanning plate and the partial beams of the detector arrangement that are to be detected are each delivered via waveguides. In one such variant of the known position measuring device, the scale and the scanning unit with the scanning plate are movable relative to one another. Typically, the scale is stationary and the scanning unit is movable. Between the scanning unit and the separate signal unit having the light source and the detector arrangement, a mechanical connection or mechanical coupling therefore exists, via the waveguides that are supplied. However, for high-precision applications, such a mechanical coupling of the movable scanning unit to the signal unit, which does not move with the scanning unit, can be disadvantageous and can lead to inaccuracies in the position determination.

OBJECTS AND SUMMARY OF THE INVENTION

An object of the present invention is to create a position measuring device for high-precision position detection, in which the movable components of the position measuring device are, if at all possible, not coupled mechanically to other components of the position measuring device. Also needed are a compact construction and the greatest possible insensitivity to tilting of individual components of the position measuring device.

This object is attained according to the present invention by a position measuring device including a reflective scale and a scanning unit. The scanning unit includes a retroreflector and a signal unit wherein the signal unit includes a light source and a detector arrangement. The scanning unit and the signal unit are structurally separate from one another and are disposed in planes parallel to one another, and wherein the scanning unit is movable relative to the reflective scale in a measuring direction. The light source emits a beam that propagates freely in a direction to the scanning unit, wherein from the scanning unit along the direction to the signal unit a pair of interfering partial beams propagate freely and wherein between the signal unit and the scanning unit the partial beams propagate freely in a propagation direction that is oriented perpendicular to the planes.

This object is also attained according to the present invention by an apparatus including a fine-positioning table, a coarse-positioning table and a position measuring device. The position measuring device includes a reflective scale that is disposed in a stationary fashion and a scanning unit disposed on the fine-positioning table, which positions the scanning unit relative to the reflective scale in a measuring direction. The scanning unit includes a retroreflector and a signal unit disposed on the coarse-positioning table, which positions the signal unit in the measuring direction. The signal unit including a light source and a detector arrangement, wherein the scanning unit and the signal unit are structurally separate from one another and are disposed in planes parallel to one another. In addition, the scanning unit is movable relative to the reflective scale in the measuring direction. The light source emits a focused beam that propagates freely in a direction to the scanning unit, wherein from the scanning unit along the direction to the signal unit a pair of interfering partial beams propagate freely and wherein between the signal unit and the scanning unit the partial beams propagate freely in a propagation direction that is oriented perpendicular to the planes.

According to the present invention, it is now provided that the focused beams propagate between the signal unit and the scanning unit in both directions as freely propagated beams, i.e., without having to be deflected via optical elements disposed between the signal unit and the scanning unit and/or without requiring signal transmission via waveguides. To that end, the scanning unit and the signal unit are disposed in planes that are parallel to one another. In addition, the propagation direction of the freely propagated beams between these units is oriented perpendicular to the aforementioned planes in which the scanning unit and signal unit are disposed.

The position measuring device according to the present invention includes a reflective scale, a scanning unit with at least one retroreflector, and a signal unit with at least one light source and a detector arrangement. The scanning unit and the signal unit are embodied as structurally separate units, and the scanning unit is disposed to move relative to the scale in at least one measuring direction. At least one focused beam emitted by the light source propagates as a freely propagated beam from the signal unit in the direction of the scanning unit. From the scanning unit, at least one pair of interfering partial beams propagate as freely propagated beams in the direction of the signal unit. The scanning unit and the signal unit are disposed in planes parallel to one another. The propagation direction of at least some of the freely propagated beams between the signal unit and the scanning unit is oriented perpendicular to these planes (FIG. 1).

Preferably, the planes in which the scanning unit and the signal unit are disposed are oriented parallel to the plane of the scale.

It can be provided that the detector arrangement in the signal unit includes a plurality of optical detector elements, which are preceded by at least one lens, which focuses the freely propagated beams, propagating in the direction of the detector elements, at the detector elements.

It is possible that the at least one pair of interfering partial beam propagates as freely propagated beams each in collinear fashion, with a polarization orthogonal to one another, from the scanning unit in the direction of the signal unit.

Advantageously, the at least one pair of interfering partial beams in the scanning unit each undergoes superposition and splitting into at least two resultant partial beams. The at least two resultant partial beams propagate as freely propagated beams separately from the scanning unit in the direction of the signal unit.

In one possible embodiment, the freely propagated beam propagating from the light source to the scanning unit passes through the scanning unit undeflected in the direction of the scale.

The scanning unit can further include a splitting element, and the signal unit can include two detector arrangements, so that after the splitting of the focused beam arriving from the light source via the splitting element, two asymmetrical scanning beam paths result. In addition, via the two detector arrangements, scanning signals can be detected that allow for a simultaneous position determination in at least one lateral displacement direction and also in a vertical displacement direction of the scanning unit relative to the scale.

The retroreflector in the scanning unit can be embodied as a lens-mirror retroreflector, and the scanning unit can include a transparent, plane-parallel carrier substrate, on whose side toward the scale at least first and second lens elements are disposed and on whose side facing away from the scale at least one reflector element is disposed. The first and second lens elements can be embodied as diffractive lenses applied to the carrier substrate. Moreover, the reflector element can be embodied as a reflection coating applied to the carrier substrate, the reflective side of which coating is oriented in the direction of the lens elements.

It is possible here that the first lens elements exert both a deflecting effect and an at least partially focusing effect toward the reflector element on the partial beams as they pass through, and the second lens elements exert both a deflecting effect and an at least partially collimating effect on the partial beams as they pass through.

The first and second lens elements can have a focal length which is equivalent to the optical distance between the lens elements and the reflector element.

It is furthermore possible that the retroreflector in the scanning unit is embodied as a ridge prism, whose ridge is oriented in the measuring direction.

It can further be provided that the light source and/or the detector elements are disposed outside the signal unit and are connected to the signal unit by optical fibers.

In an apparatus having the position measuring device according to the present invention, it can be provided that the scale is disposed in stationary fashion, the scanning unit is disposed on a fine-positioning table, which positions the scanning unit relative to the scale at least in the measuring direction, and the signal unit is disposed on a coarse-positioning table, which positions the signal unit at least in the measuring direction.

Preferably, of the units that are movable over the positioning tables, only the signal unit is connected via cable connections to downstream stationary components.

It can be provided here that the scale is disposed above the fine-positioning table, and the fine-positioning table is disposed above the coarse-positioning table.

Because of the provisions of the present invention, it is now possible to dispense with a connection of the scanning unit to the signal unit via waveguides. In this way, interfering forces on the movable scanning unit which would otherwise result can be minimized virtually entirely. By way of the selected guidance of the freely propagated beams between the scanning unit and the signal unit, which in particular require no beam deflection, associated with the scanning unit via mirrors or the like, only minimal optical travel lengths for the freely propagated beams ensue. As a result, any errors that might result in the position determination in the event of possible tilting of the scanning unit and scale can be minimized.

Moreover, still further advantages with regard to the structural size of the scanning unit are obtained. Since robust transmission of a plurality of freely propagated beams in a way that is relatively invulnerable to interference requires a correspondingly large inlet and outlet faces of the scanning unit, it is especially advantageous to dispose these faces parallel to the scanning face on the scale, which when high accuracy is required must also be lengthened. An additional increase in the size of the scanning unit perpendicular to the scanning face can thus be avoided.

Also, in the event that fast braking becomes necessary, for instance in emergency situations, considerable advantages arise if briefly great lateral displacements of the scanning unit parallel to the scanning face occur. Since the components of the position measuring device of the present invention are disposed parallel to this displacement direction, mutual contact of these components and, thus, damage to them can be avoided.

Further details and advantages of the present invention will be explained in the ensuing description of exemplary embodiments in conjunction with the drawings.

DETAILED DESCRIPTION OF THE PREFERRED EMBODIMENTS

Figure 1:
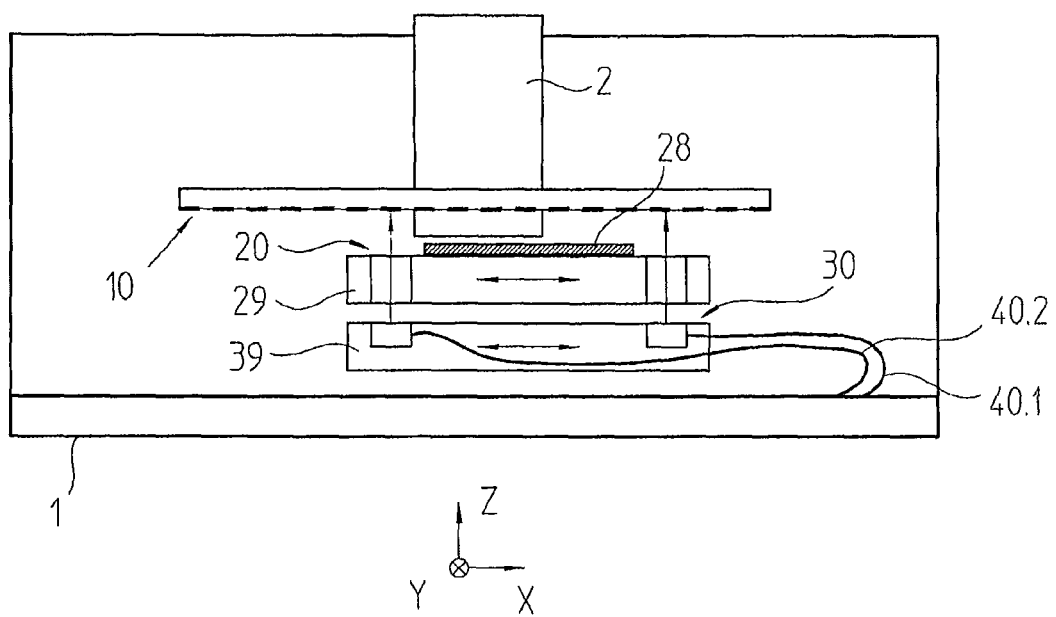
FIG. 1 shows a schematic view of an embodiment of an apparatus having a position measuring device in accordance with the present invention.

In FIG. 1, in highly schematic form, an apparatus is shown in which the position measuring device of the present invention can advantageously be used. This can, for instance, be a semiconductor production device, which has a stationary frame 1 with a machine component 2. As the stationary machine component 2, a tool in the form of a microscope or a lithography lens can, for instance, be provided. A coarse-positioning table 39 and a fine-positioning table 29 disposed on the coarse-positioning table 39 are movable in at least one measuring direction x relative to the stationary frame 1 and the machine component 2. An object 28 that has to be positioned precisely relative to the stationary machine component 2 is placed on the fine-positioning table 29. The coarse positioning of the object 28 is accomplished via the coarse-positioning table 39, and the fine positioning of the object 28 is performed via the fine-positioning table 29. Linear drives, which for the sake of simplicity are not shown in FIG. 1, are used for positioning the two tables 29, 39 in a stacked arrangement.

A reflective scale 10 of the position measuring device of the present invention is secured to the stationary machine component 2. The surface of the reflective scale 10 that is to be scanned is oriented to face in the direction of the fine-positioning table 29. The scale 10 includes a periodic arrangement, in one or two measuring directions x, y, of graduation regions that have different optical reflection properties. For example, the scale 10 can be embodied as a one- or two-dimensional incident-light phase graduation. For the sake of simpler illustration, the assumption hereinafter will be that a one-dimensional scale 10 is used that extends in a measuring direction x. Such a scale 10 allows for a relative motion of the object 28 with respect to the stationary machine component 2 to be detected in the measuring direction x. It is understood that the scale 10 can alternatively be embodied as a two-dimensional cross grating, if position detection is additionally to be done in the second measuring direction y, which is oriented perpendicular to the x direction.

A scanning unit 20 of the position measuring device of the present invention is disposed on the fine-positioning table 29 provided below the scale 10 and includes at least one retroreflector. The coarse-positioning table 39 is disposed under the fine-positioning table 29 along with a signal unit 30 of the position measuring device of the present invention. In addition, the signal unit 30 has at least one light source and one detector arrangement. While the scanning unit 20 and the signal unit 30 are indicated only highly schematically in FIG. 1, they will be described more precisely below, in conjunction with the other drawings.

It can also be seen from FIG. 1 that of the movable scanning unit 20 and signal unit 30 of the position measuring device of the present invention, only the signal unit 30 disposed on the coarse-positioning table 39 is connected via cable connections 40.1, 40.2 to the downstream stationary components of the apparatus, or, in other words, to the frame 1 or to machine components coupled to the frame. With regard to the scanning unit 20 on the fine-positioning table 29, no cable connection and, thus, no mechanical coupling with stationary components is provided. Via the cable connections 40.1, 40.2, the signal unit 30 is supplied with electrical power, for instance, and/or the position-dependent scanning signals generated via the position measuring device of the present invention are delivered to a downstream evaluation unit, not shown. On the basis of the scanning signals, the evaluation unit controls the precise positioning of the object 28 in the apparatus.

Figure 2A:
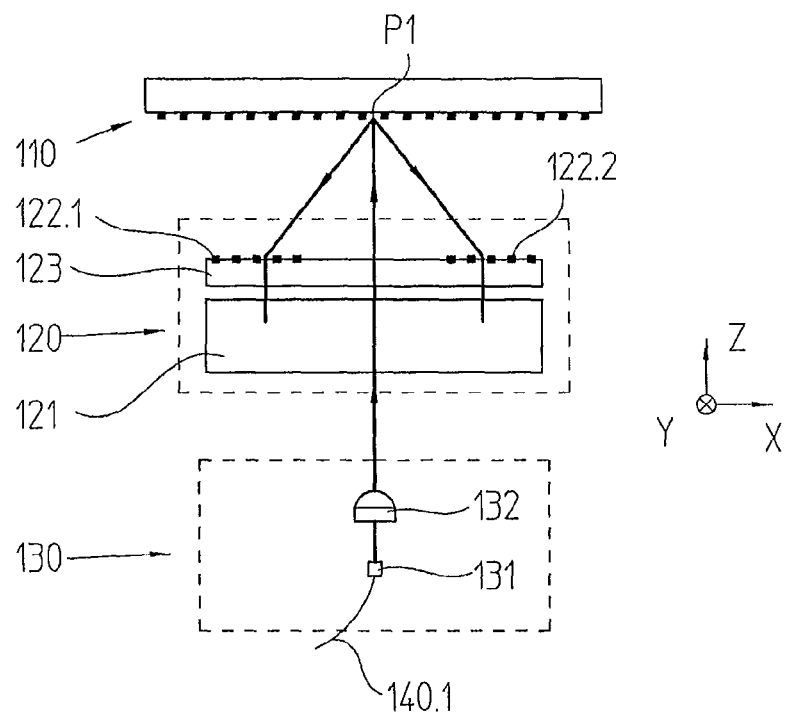
FIGS. 2a-2c show various views of a first embodiment of a position measuring device to be used with the apparatus of FIG. 1 in accordance with the present invention.
Figure 2B:
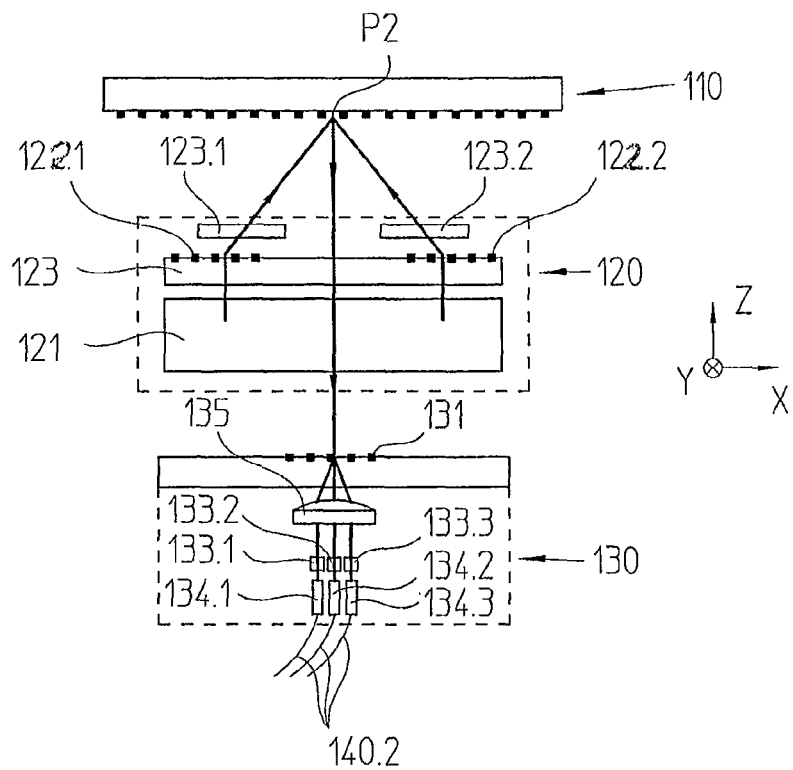
Figure 2C:
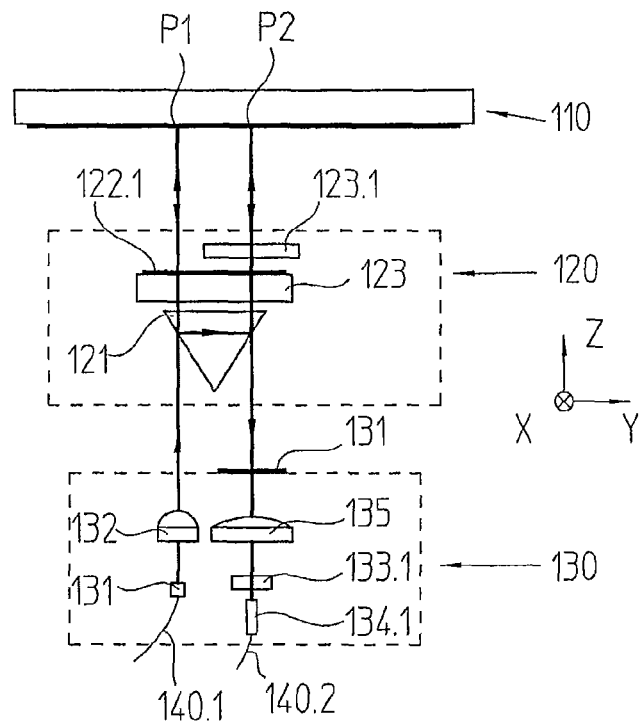

A first embodiment of the position measuring device of the present invention, which can be used in an apparatus of the kind shown in FIG. 1, will now be described in detail in conjunction with FIGS. 2a-2c. FIGS. 2a and 2b each schematically show partial scanning beam paths in the x-z plane, while FIG. 2c shows a view of the scanning beam path in the y-z plane. In FIG. 2a, the partial scanning beam path is shown from the light source 131 in the signal unit 130 to the retroreflector 121 in the scanning unit 120. FIG. 2b shows the partial scanning beam path from the retroreflector 121 in the scanning unit 120 to the optical detector elements 134.1-134.3 of the detector arrangement in the signal unit 130.

The scanning beam path of the first embodiment of the optical position measuring device of the present invention will first be described, in conjunction with FIGS. 2a-2c.

The linearly polarized focused beam emitted by the light source 131, for instance a laser diode, is first collimated via a collimator lens 132, or, in other words, converted into a parallel focused beam. Both the light source 131 and the collimator lens 132 are disposed in the signal unit 130. The collimated focused beam then propagates as a freely propagated beam from the signal unit 130 to the structurally separate scanning unit 120 and passes through the scanning unit 120 undeflected in the direction of the scale 110. Then, the focused beam strikes the scale 110 a first time at a first target site P1. On the first impact of the focused beam at the scale 110, the incident focused beam is split into two partial beams, which are reflected back as $+/-1^{st}$ orders of refraction in the direction of the scanning unit 120.

In the scanning unit 120 shown in FIG. 2a, the retroreflected partial beams from the scale 110 first pass through transmissive scanning gratings 122.1, 122.2, which are disposed on a scanning plate 123. Via the scanning gratings 122.1, 122.2, the parallel alignment of the two retroreflected partial beams is effected, and the partial beams then reach a retroreflector 121. In the present example, this retroreflector 121 is embodied in the form of a ridge prism, whose ridge is oriented in the measuring direction x. From the retroreflector 121, the partial beams, offset in the y direction, are again reflected back in the incidence direction and again strike the scanning gratings 122.1, 122.2 on the scanning plate 123. Because of the orientation of its ridge in the measuring direction x, the ridge prism accordingly functions in the y direction as a retroreflector.

Via the scanning gratings 122.1, 122.2, a deflection of the partial beams is effected in the direction of the optical axis of the entire system, toward a second target site P2 on the scale 110, as shown in FIG. 2b. The second target site P2 is offset here in the y direction in the plane of the scale 110, relative to the first target point P1, as can be seen for instance from FIG. 2c. Before striking the scale 110 a second time, the partial beams in the scanning unit 120 also pass through polarizing optical components 123.1, 123.2 in the form of λ/4 plates. The λ/4 plates cause one partial beam to be polarized in left-handed circular fashion and the other partial beam to be polarized in right-handed circular fashion.

At the second target site P2 on the scale 110 as shown in FIG. 2b, the partial beams arriving at P2 are superimposed and are reflected back along the z-direction in the form of a pair of interfering partial beams to the scanning unit 120. The pair of interfering partial beams then pass undeflected through the scanning unit 120 and propagate as freely propagated beams from the scanning unit 120 in the direction of the signal unit 130. In the present exemplary embodiment, the at least one pair of interfering partial beams propagate in col-linear fashion, with circular polarization perpendicular to one another of the two partial beams from the scanning unit 120 to the signal unit 130.

In the signal unit 130, the pair of interfering partial beams first strikes a transmissive splitting grating 131, which splits them into three further partial beams as shown in FIG. 2b. The three further partial beams propagate onward in three different directions in space to a lens 135, which focuses the three further partial beams on the downstream optical detector elements 134.1-134.3. After passing through the lens 135, the three partial beams each pass through suitably oriented polarizers 133.1-133.3, before striking the three optical detector elements 134.1-134.3. In the event of relative motion of the scale 110 and the scanning unit/signal unit 120/130, the three optical detector elements 134.1-134.3 generate three scanning signals, phase-offset by 120° each, which can be processed further by an evaluation unit.

For the present invention as described with respect to FIGS. 2a-c, it is not primarily the scanning beam path on which the signal generation is based that is definitive, but rather the disposition of the various components of the position measuring device in the scanning unit 120 and the signal unit 130, or the relative disposition of these units to one another.

Thus, it is decisive that the focused beam emitted by the light source 131, along its way to the first target site P1 on the scale 110, propagates as a freely propagated beam from the signal unit 130 in the direction of the scanning unit 120. It is also decisive that on the return trip from the second target site P2 to the detector arrangement, the interfering partial beams likewise propagate as freely propagated beams from the scanning unit 120 in the direction of the signal unit 130.

Because of the freely propagated beams oriented parallel to the optical axis between the signal unit 130 and the scanning unit 120, wide tolerances in the z direction in both assembly and operation are acceptable, without impairing the scanning signals as a result. This is especially important whenever the position of the fine-positioning table 29 of FIG. 1 relative to the coarse-positioning table 39 is adjustable in the z direction by corresponding actuators. However, resultant displacements of the signal unit 130 and the scanning unit 120 in the x and y directions lead to beam displacements. A suitably large lens 135 upstream of the detector elements 134.1-134.3 then ensures that the two interfering partial beams are always focused entirely on the detector elements 134.1-134.3. Since the focal site remains unaffected by the aforementioned beam displacements, the focusing via the lens 135 makes it possible to use small and hence fast optical detector elements 134.1-134.3.

According to the present invention, it is also provided that the scanning unit 120 and the signal unit 130 are disposed in planes parallel to one another. In the first exemplary embodiment described above with respect to FIGS. 2a-c, these planes are moreover disposed parallel to the plane of the scale 110. The propagation direction of at least some of the freely propagated beams that are propagating between the scanning unit 120 and the signal unit 130 is oriented perpendicular to each of these planes.

By way of these provisions, which can also be utilized in combination with other scanning beam paths in the exemplary embodiments still to follow below, the definitive advantages of the position measuring device of the present invention are attained, such as minimizing interfering forces on the scanning unit, lessening the sensitivity to tilting, reducing the structural size, and so forth.

As seen in FIGS. 2a-2c, only a connection of the signal unit 130 to the stationary components via cable connections 140.1, 140.2 is required. Thus, via the cable connection 140.1, the light source 131 is supplied with electrical power, and via the cable connections 140.2, the resultant scanning signals of the detector elements 134.1-134.3 are delivered to a downstream stationary evaluation unit. Conversely, the movable scanning unit 120 is fully decoupled mechanically from the stationary machine components.

Especially, the selection of the various planes in which the scanning unit 120 and the signal unit 130 are disposed, and the omission of any optical elements between the scanning and signal units, are definitive for minimal optical travel lengths in the scanning beam path. As a result, the lever arms in the event of tilting of the scanning unit 120 and/or of the signal unit 130 relative to the scale 110 can be minimized, which considerably lessens possible signal errors in that case.

A second embodiment of the position measuring device of the present invention to be used with the apparatus of FIG. 1 will be described in conjunction with FIGS. 3a-3c. The illustrations of the various partial scanning beam paths in the various planes in the views correspond to those of the first exemplary embodiment of FIGS. 2a-c. Essentially, only the definitive differences from the first exemplary embodiment will be discussed below.

Figure 3A:
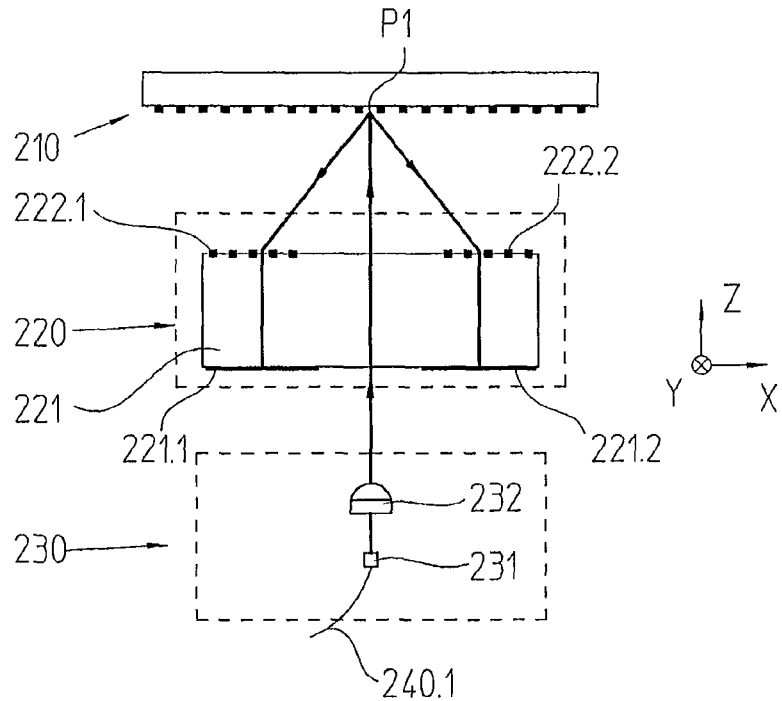
FIGS. 3a-3c show various views of a second embodiment of a position measuring device to be used with the apparatus of FIG. 1 in accordance with the present invention.
Figure 3B:
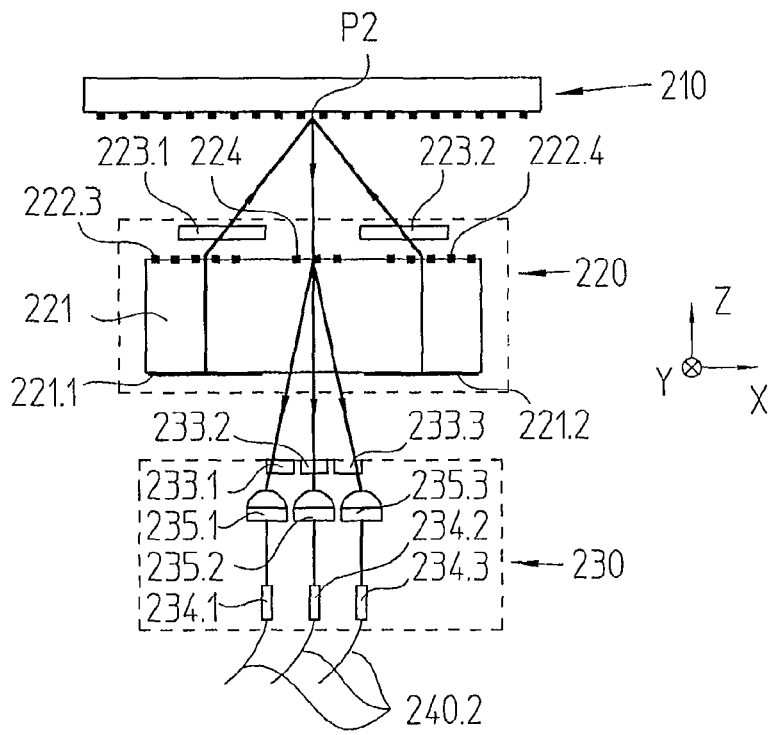
Figure 3C:
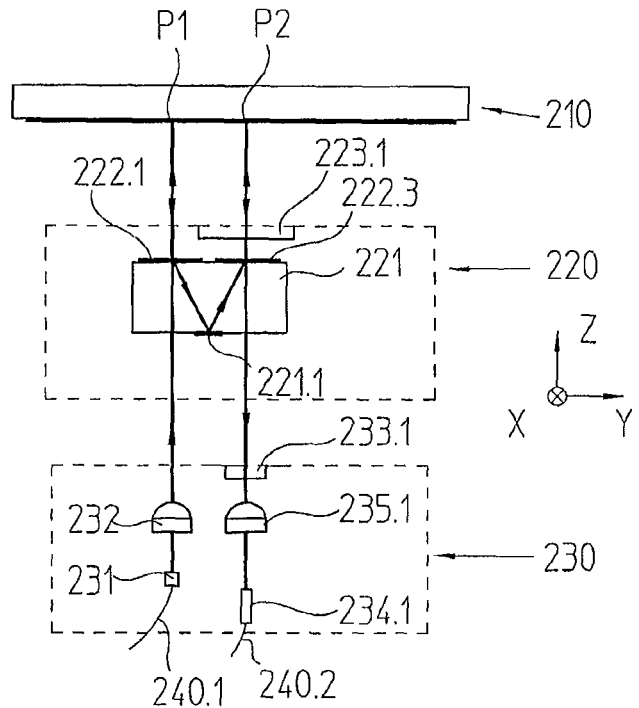

One of the differences between the embodiments of FIGS. 2a-c and in FIGS. 3a-c is the embodiment of the retroreflector 221 in the scanning unit 220. Thus, the retroreflector 221 is now embodied as a lens-mirror retroreflector, as known for instance from EP 1 739 395 A2 of the present Applicant, mentioned at the outset. The retroreflector 221 includes a transparent, plane-parallel carrier substrate, on whose side toward the scale 210 first lens elements 222.1, 222.2 and second lens elements 222.3, 222.4 are disposed and on whose side facing away from the scale 210 reflector elements 221.1, 221.2 are disposed. The first and second lens elements 222.1, 222.2 and 222.3, 221.4, respectively, are embodied as grating structures and diffractive lenses, respectively, which are applied to the carrier substrate and on each pass through them of the partial beams, they each exert a defined lens action on the partial beams.

The reflector elements 221.1, 221.2 are embodied as reflective coatings which are applied to the carrier substrate and whose reflective sides are each oriented in the direction of the associated lens elements 222.1, 222.2, 222.3, 222.4 located above them.

Via the first lens elements 222.1, 222.2, as can be seen from FIG. 3a, what happens on the passage to the split partial beams is a deflection action in the measuring direction x and oriented antiparallel to the direction of incidence. Thus, the two partial beams are aligned parallel to the optical system axis. Via the first lens elements 222.1, 222.2, the two partial beams are also focused perpendicular to the measuring direction toward the respective reflector element 221.1, 221.2.

On the passage through the second lens elements 222.3, 222.4, these elements exert, first, a deflecting action in the measuring direction x toward the second target point P2 on the scale 210. Second, the second lens elements 222.3 and 222.4 exert an at least partially collimating effect, oriented perpendicular to the measuring direction x, on the focused beams that pass through them.

In the present exemplary embodiment, the first and second lens elements 222.1, 222.2, 222.3, 222.4 each have a focal length that is equivalent to the optical distance between each lens element 222.1, 222.2, 222.3, 222.4 and the associated reflector element 221.1, 221.2.

As a further difference from the first exemplary embodiment of FIGS. 2a-c, an alternative embodiment of the position measuring device for detecting the phase-shifted scanning signals should be mentioned. As can be seen from FIG. 3b, it is provided that the pair of interfering partial beams, which are reflected back from the second target site P2 on the scale 210 in the direction of the scanning unit 220, must already be split in the scanning unit 220, via a splitting grating 224, into a plurality of partial beams, which propagate separately from one another as freely propagated beams at various angles in the direction of the signal unit 230. In the signal unit 230, the split partial beams each pass through respective polarizers 233.1-233.3, and are then focused via lenses 235.1-235.3 on the downstream optical detector elements 234.1-234.3. There, the phase-shifted, position-dependent scanning signals again result.

In this exemplary embodiment, to allow wide assembly and operation tolerance in the z direction between the scanning unit 220 and the signal unit 230, the angles between the freely propagated beams that propagate back to the signal unit 230 must not be overly large. Thus, the angle of the freely propagated beams relative to the optical axis must if at all possible be less than 30°. In the event of z-displacements of the signal unit 230 or of the scanning unit 220, the resultant displacements in the x and y directions then remain limited. The lenses 235.1-235.3 must have a large enough diameter that within the allowable beam displacements, the partial beams are always focused or projected completely onto the optical detector elements 234.1-234.3. Under some circumstances it may also be advantageous, instead of the three lenses 235.1-235.3, to provide a single lens, which focuses all the partial beams jointly. Then, the various angles of the freely propagated beams are each assigned separate focal sites at each of which the respective optical detector elements 234.1-234.3 are disposed. In this case, the polarizers 233.1-233.3 should be disposed just upstream of the optical detector elements 234.1-234.3.

For further details of the scanning beam path of the second exemplary embodiment of the position measuring device of FIGS. 3a-c in accordance with the present invention, see EP 1 739 395 of the present Applicant, already mentioned above.

Moreover, the basic layout of this exemplary embodiment, in particular the disposition in the scanning unit 220 and in the signal unit 230 of the various components needed on the scanning side for scanning the scale 210, and their relative disposition to one another, are equivalent to the first exemplary embodiment of FIGS. 2a-c.

Figure 4A:
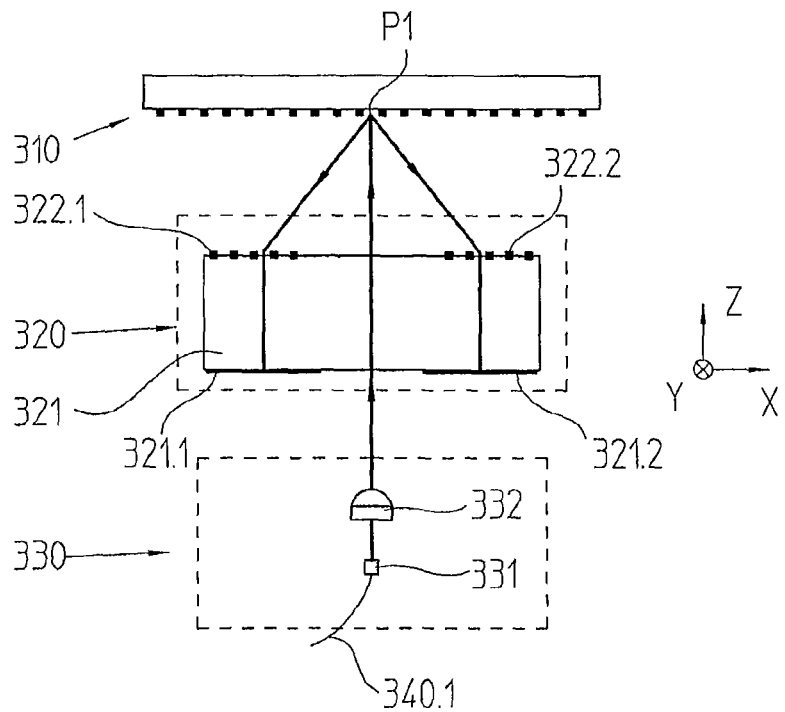
FIGS. 4a-4c show various views of a third embodiment of a position measuring device to be used with the apparatus of FIG. 1 in accordance with the present invention.
Figure 4B:
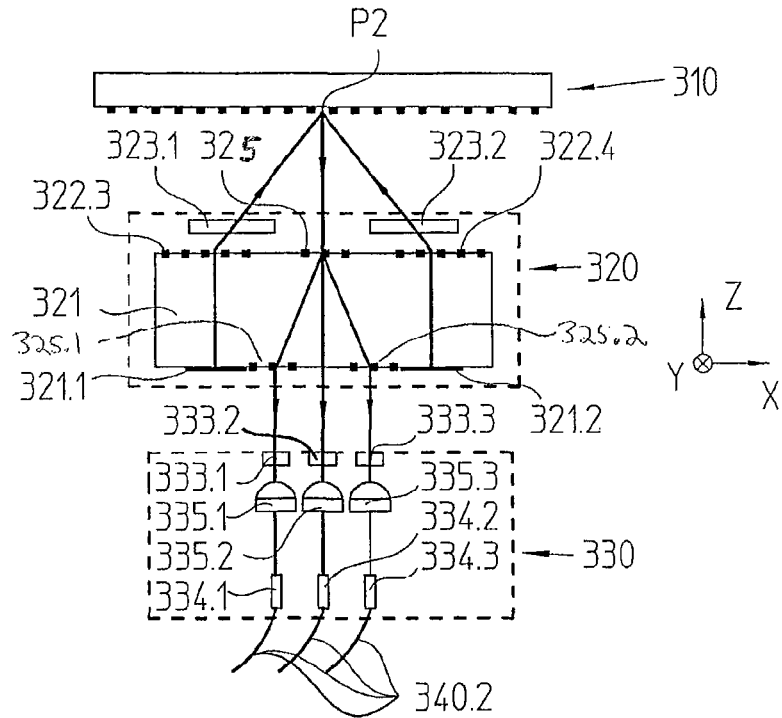
Figure 4C:
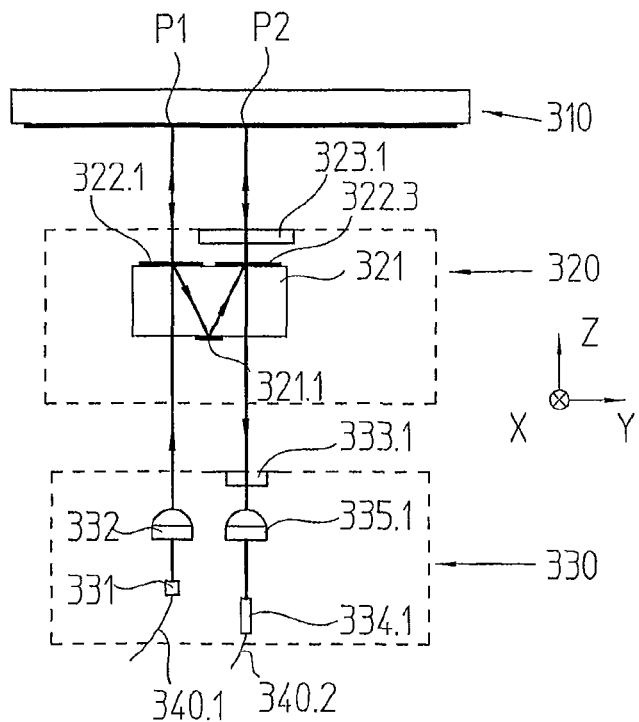

A variant that is modified slightly again compared to the second exemplary embodiment of FIGS. 3a-c is shown in FIGS. 4a-4c as the third exemplary embodiment of the position measuring device of the present invention. FIGS. 4a-c show the scanning beam path analogously to the views in the preceding exemplary embodiments of FIGS. 2a-c and 3a-c. Once again, only the differences from the previous exemplary embodiment of FIGS. 3a-c will be explained.

Now, as in the second exemplary embodiment of FIGS. 3a-c, it is again provided that the pair of interfering partial beams arriving at the scale 310 from the second target site P2 are split, via a splitting grating 324 in the scanning unit 320, into three partial beams, which propagate onward in three different directions. Each of the two partial beams deflected to the left and right in FIG. 4b is assigned a transmissive deflection grating 325.1 and 325.2, respectively, in the scanning unit 320. Via these transmissive deflection gratings 325.1, 325.2, the corresponding two partial beams each experience a deflection in the direction of the optical system axis, so that downstream of the scanning unit 320, the three partial beams propagate in parallel as freely propagated beams in the direction of the signal unit 330. There, the further scanning beam path and the signal generation are equivalent to those in the second exemplary embodiment described above with respect to FIGS. 3a-c. The embodiment of the retroreflector 321 in the scanning unit 320 as a lens-mirror retroreflector is also provided identically to the second exemplary embodiment of FIGS. 3a-c.

Since here, as in the first exemplary embodiment of FIGS. 2a-c, all the freely propagated beams extend parallel to the optical axis, especially wide assembly and operating tolerances in the z direction are made possible.

Figure 5A:
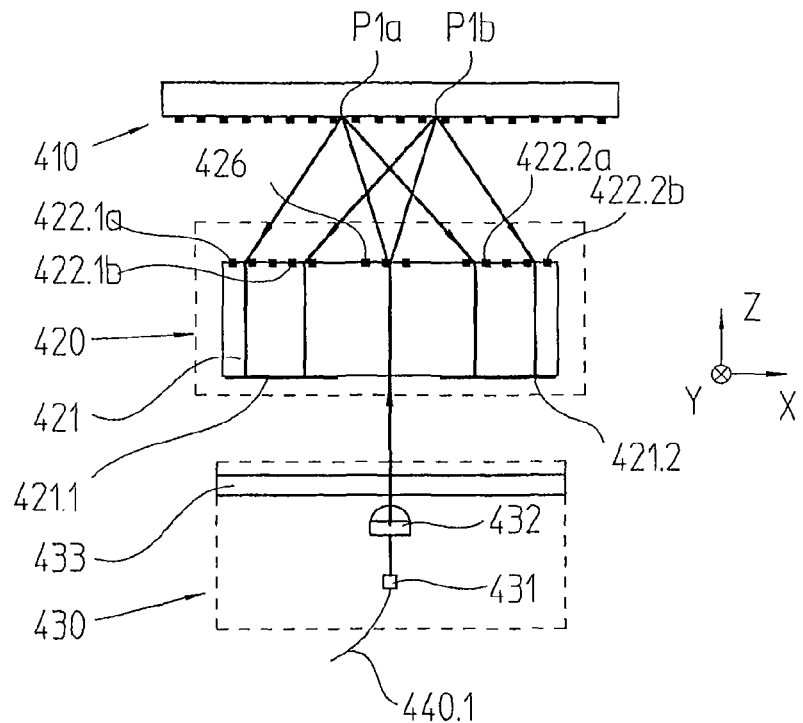
FIGS. 5a-5c show various views of a fourth embodiment of a position measuring device to be used with the apparatus of FIG. 1 in accordance with the present invention.
Figure 5B:
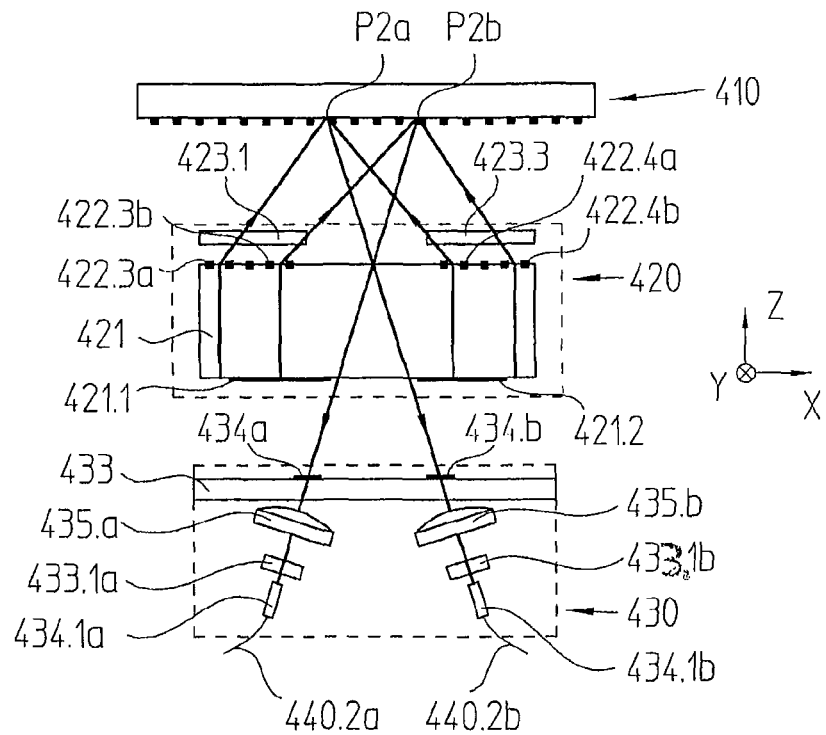
Figure 5C:
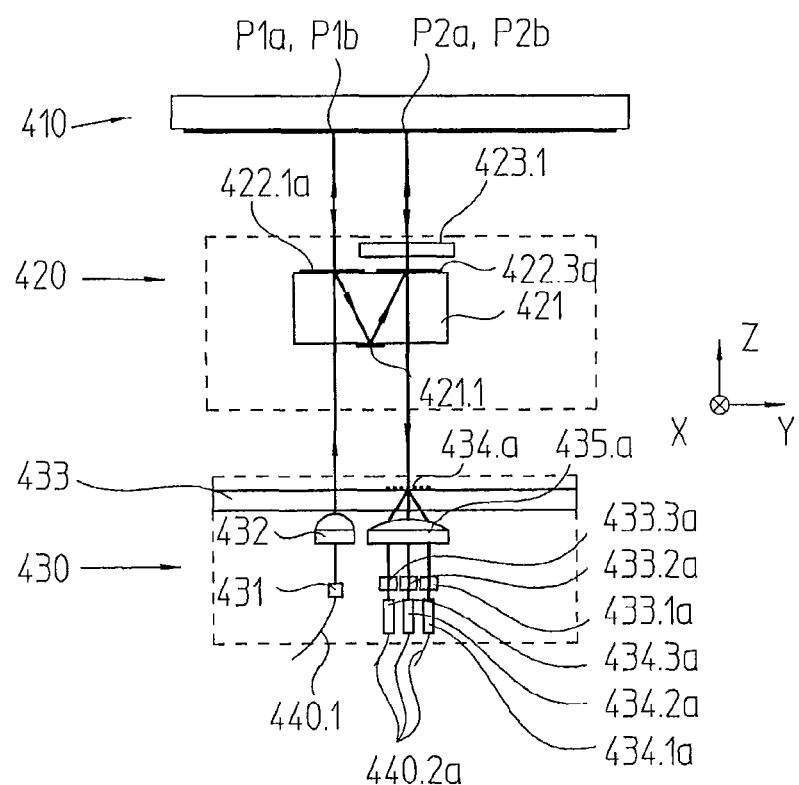

Finally, a fourth exemplary embodiment of the position measuring device of the present invention will be explained in conjunction with FIGS. 5a-5c. Once again, FIGS. 5a-5c show the various partial scanning beam paths analogously to the previous examples.

Unlike in the foregoing examples, it is now provided, by way of the corresponding disposition of components in the scanning unit 420 and in the signal unit 430, that two separate scanning beam paths are embodied, by way of which the scale 410 is scanned. The two scanning beam paths here are embodied asymmetrically relative to a plane that is perpendicular to the lateral displacement direction x and they permit a position determination for lateral displacement motions in the x direction as well as a position determination for vertical displacement motions in the z direction perpendicular to it. On the output side, the overall result is six phase-shifted scanning signals, from which the position changes in the lateral and vertical directions can be ascertained in a known manner. With regard to this measurement principle, EP 1 762 828 A2 of the present Applicant is explicitly referred to.

In order to embody two separate scanning beam paths in the position measuring device of the present invention, a splitting element 426 in the form of a splitting grating is provided in the scanning unit 420. The splitting element 426 is disposed on the top side of the carrier substrate of the retroreflector 421. Via the splitting grating 426, the focused beam arriving from the light source 431 in the signal unit 430 is split into two partial beams, which then act on the scale 410 at the first target sites P1a, P1b. The following scanning beam paths, until they reenter the signal unit 430, each correspond to the second exemplary embodiment of FIGS. 3a-c. Accordingly, the retroreflector 421 is again embodied as a lens-mirror retroreflector. In view of the two scanning beam paths now provided, the required number of lens elements 422.1a, 422.2a, 422.3a, 422.4a, 422.1b, 422.2b, 422.3b, 422.4b in the retroreflector 421 is doubled. The optical effects of the various lens elements 422.1a, 422.2a, 422.3a, 422.4a, 422.1b, 422.2b, 422.3b, 422.4b in the two scanning beam paths are basically selected identically to the second exemplary embodiment of FIGS. 3a-c.

In each of the two scanning beam paths, from each of the second target sites P2a, P2b, one pair each of interfering partial beams then propagates as freely propagated beams from the scanning unit 420 in the direction of the signal unit 430. In the signal unit 430, the two pairs of interfering partial beams each strike respective splitting gratings 434.a, 434.b, which analogously to the first exemplary embodiment of FIGS. 2a-c split each of the incident partial beams into three further partial beams and deliver them each via a respective lens 435a, 435b. The three further partial beams are then sent to a plurality of analyzers 433.1a, 433.2a, 433.3a, 433.1b, 433.2b, 433.3b to what are now the six optical detector elements 434.1a, 434.2a, 434.3a, 434.1b, 434.2b, 434.3b, by way of which the phase-shifted scanning signals are detected. On the detection side, in this exemplary embodiment, accordingly two detector arrangements are provided by the two scanning beam paths embodied, and via each detector arrangement, a plurality of phase-shifted scanning signals are generated.

In order to achieve the widest possible assembly and operating tolerance of the scanning unit 420 and the signal unit 430 in the z direction, the freely propagated beams that propagate from the scanning unit 420 to the signal unit 430 should, analogously to one foregoing exemplary embodiment, have an angle of only 30° at most to the optical axis in the z direction.

In this exemplary embodiment of the position measuring device of the present invention as well, despite the different scanning beam paths, the aforementioned provisions with regard to the embodiment and disposition of the scanning unit 420 and the signal unit 430 are implemented.

The foregoing description is provided to illustrate the present invention, and is not to be construed as a limitation. Numerous additions, substitutions and other changes can be made to the invention without departing from its scope as set forth in the appended claims.

For instance, the actual light source of the position measuring devices of the present invention can also be mounted outside the signal unit, and the delivery of light to the signal unit from the externally disposed light source is then effected via an optical fiber. In the signal unit, the outlet face of this fiber then functions as a light source. The fiber is preferably embodied as a polarization-preserving single-mode fiber. The externally disposed light source prevents unwanted heat generation in the signal unit.

In another alternative embodiment, the optical detector elements, too, can be accommodated outside the signal unit. For that purpose, instead of the optical detector elements, respective optical multi-mode fibers should be provided in the signal unit, and the inlet facets of the fibers are each disposed in the focus of the partial beams. Thus the inlet facets of the fibers function as detector elements in the signal unit. On the other end of the multi-mode fibers, externally disposed optical detector elements each receive the transmitted beam of light. Disposing the actual detector elements externally can prevent heat-generating preamplifiers from having to be accommodated in the signal unit.

We claim:

1. A position measuring device, comprising:
    a reflective scale,
    a scanning unit comprising a retroreflector; and:
    a signal unit comprising a light source and a detector arrangement, wherein said scanning unit and said signal unit are structurally separate from one another and are disposed in planes parallel to one another, and wherein said scanning unit is movable relative to said reflective scale in a measuring direction, and
    said light source emits a beam that propagates freely in a direction to said scanning unit, wherein from said scanning unit along said direction to said signal unit a pair of interfering partial beams propagate freely and wherein between said signal unit and said scanning unit said partial beams propagate freely in a propagation direction that is oriented perpendicular to said planes.

2. The position measuring device according to claim 1, wherein said planes are parallel to a plane of said reflective scale.

3. The position measuring device according to claim 1, wherein said detector arrangement comprises a plurality of optical detector elements, wherein said plurality of optical detector elements is preceded by at least one lens, which focuses said pair of interfering partial beams at said plurality of optical detector elements.

4. The position measuring device according to claim 1, wherein said pair of interfering partial beams propagate as freely propagated beams in collinear fashion, with a polarization orthogonal to one another, from said scanning unit in said direction of said signal unit.

5. The position measuring device according to claim 1, wherein said pair of interfering partial beams in said scanning unit undergo superposition and splitting into at least two resultant partial beams, which propagate freely and separately from said scanning unit in said direction of said signal unit.

6. The position measuring device according to claim 1, wherein said beam propagating freely from said light source to said scanning unit passes through said scanning unit undeflected in said direction of said reflective scale.

7. The position measuring device according to claim 1, wherein said scanning unit comprises a splitting element, and said signal unit comprises a second detector arrangement, wherein said splitting element splits said beam so that two asymmetrical scanning beam paths result, and via said detector arrangement and said second detector arrangement, scanning signals can be detected, by way of which signals a simultaneous position determination in at least one lateral displacement direction and also in a vertical displacement direction of said scanning unit relative to said reflective scale is possible.

8. The position measuring device according to claim 1, wherein said retroreflector is a lens-mirror retroreflector, and said scanning unit comprises a transparent, plane-parallel carrier substrate, on whose side toward said reflective scale a first lens element and a second lens element are disposed and on whose side facing away from said reflective scale a reflector element is disposed.

9. The position measuring device according to claim 8, wherein said first lens element and said second lens element are each embodied as diffractive lenses applied to said transparent, plane-parallel carrier substrate.

10. The position measuring device according to claim 8, wherein said reflector element is a reflection coating applied to said transparent, plane-parallel carrier substrate, a reflective side of which coating is oriented in a direction of said first lens element and said second lens element.

11. The position measuring device according to claim 8, wherein said first lens element exerts both a deflecting effect and an at least partially focusing effect toward said reflector element on partial beams as they pass through said first lens element, and wherein said second lens element exert both a deflecting effect and an at least partially collimating effect on partial beams as they pass through said second lens element.

12. The position measuring device according to claim 8, wherein said first lens element has a first focal length that is equivalent to a first optical distance between said first lens element and said reflector element, and wherein said second lens element has a second focal length that is equivalent to a second optical distance between said second lens element and said reflector element.

13. The position measuring device according to claim 1, wherein said retroreflector is a ridge prism, whose ridge is oriented in said measuring direction.

14. The position measuring device according to claim 1, wherein said light source is disposed outside said signal unit and is connected to said signal unit by optical fibers.

15. The position measuring device according to claim 1, wherein said detector arrangement is disposed outside said signal unit and is connected to said signal unit by optical fibers.

16. An apparatus comprising:
    a fine-positioning table;
    a coarse-positioning table;
    a position measuring device, comprising:
        a reflective scale that is disposed in a stationary fashion,
        a scanning unit disposed on said fine-positioning table, which positions said scanning unit relative to said reflective scale in a measuring direction, said scanning unit comprising a retroreflector; and:
        a signal unit disposed on said coarse-positioning table, which positions said signal unit in said measuring direction, said signal unit comprising a light source and a detector arrangement, wherein said scanning unit and said signal unit are structurally separate from one another and are disposed in planes parallel to one another, and wherein said scanning unit is movable relative to said reflective scale in a measuring direction, and
        said light source emits a beam that propagates freely in a direction to said scanning unit, wherein from said scanning unit along said direction to said signal unit a pair of interfering partial beams propagate freely and wherein between said signal unit and said scanning unit said partial beams propagate freely in a propagation direction that is oriented perpendicular to said planes.

17. The apparatus according to claim 16, wherein of said scanning unit and said signal unit units, only said signal unit is connected via cable connections to downstream stationary components.

18. The apparatus according to claim 16, wherein said reflective scale is disposed above said fine-positioning table and said fine-positioning table is disposed above said coarse-positioning table.

* * * * *